Figure 1:
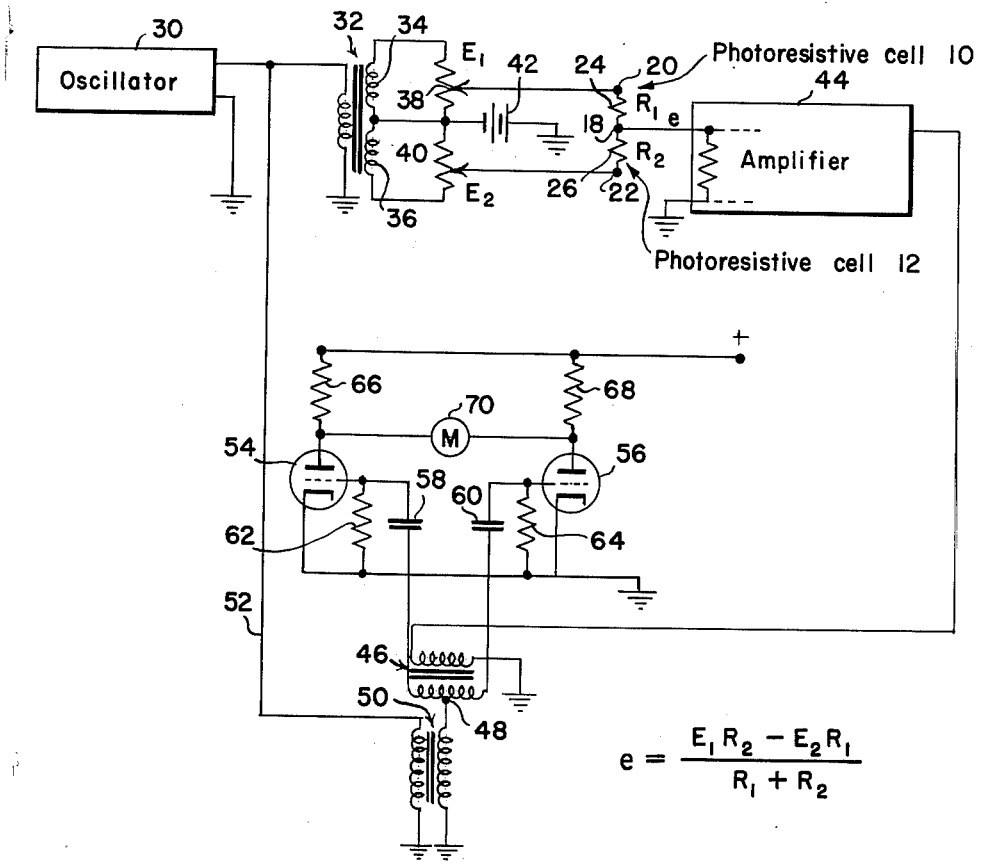

Dec. 4, 1962  R. M. GOODMAN ETAL  3,066,570
APPARATUS FOR COLOR ANALYSIS
Filed Sept. 26, 1952

$$e = \frac{E_1 R_2 - E_2 R_1}{R_1 + R_2}$$

*INVENTOR.*
ROBERT M. GOODMAN
& JOHN H. BUSSER
BY

ATTORNEYS

United States Patent Office 3,066,570
Patented Dec. 4, 1962

3,066,570
APPARATUS FOR COLOR ANALYSIS
Robert M. Goodman and John H. Busser, Philadelphia, Pa., assignors to American Electronic Laboratories, Philadelphia, Pa., a corporation of Pennsylvania
Filed Sept. 26, 1952, Ser. No. 311,636
2 Claims. (Cl. 88—14)

This invention relates to apparatus for color analysis and has particular reference to an oximeter although, as will become apparent hereafter, the invention is of broader applicability to chemical or other process control, color mixing, sorting, and various types of spectro-photometric analysis.

The invention will be described with particular reference to a device for measuring the oxygen concentration of the blood in vivo, such apparatus being commonly referred to as an oximeter. The basic method is to compare transmitted or reflected light from human tissue at two or more specified wave lengths which give rise to characteristics dependent upon the oxygen concentration of the blood. The methods heretofore used for this purpose have various drawbacks. The original method involved the use of a lamp, located so as to shine through the pinna of the ear, in combination with a pair of selenium photoelectric cells with selective light filters to detect the amount of light transmitted in the vicinity of selected wave lengths. The developed currents after passing through adjusting resistors served to actuate a galvanometer having a scale calibrated in percent oxygen saturation.

The necessity for handling direct current in this method required the use of a galvanometer of high sensitivity which was sensitive to external vibrations and very delicate. Also, because of the slow movement of the galvanometer coil, it was unable to pick up fast changes.

A more recent approach to the solution of the problem involved has utilized the modulation of the intensity of light from a lamp to give rise to an alternating output from the cells which in turn could be amplified and used to drive an indicating meter with a suitable scale. The modulation of the bulb filament led to short and unsatisfactory bulb life, and since there was no method of instantaneous comparison and correction for changes in total blood volume, an error was introduced by such a change.

In accordance with the present invention these difficulties are overcome by the use of sensitive photoresistive elements excited from an alternating voltage source. The two elements have one common terminal and to their other terminals there are applied voltages 180° out of phase with each other. If the resistances of the two elements are equal for a given set of conditions, then there will appear no resultant voltage at the common terminal, or, if the two resistance elements are unequal, the applied exciting voltages can be adjusted in amplitude to create complete cancellation at the common terminal. If, however, the light on one cell changes, then a voltage will appear at the common terminal, which has an amplitude proportional to the magnitude of the light change and of such phase as to indicate either an increase or decrease in light and from which cell, or at which wave length, the change has taken place. Since this voltage is an alternating voltage, it can be amplified using conventional electronic techniques, and the amplified current can be used to drive an indicating instrument or actuate an alarm.

The system continuously compares the light transmitted at a wave length which is sensitive to oxyhemoglobin, with the light transmitted at a wave length which is equally sensitive to oxy and reduced hemoglobin, i.e. total blood, so that the results are relatively insensitive to changes in total blood volume.

Figure 2:
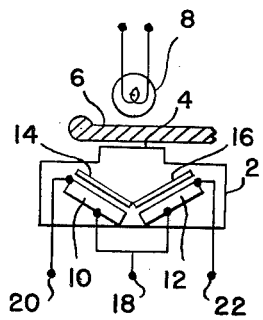

The foregoing indicates the general object of the present invention which, together with other objects particularly relating to details of construction and operation, will become apparent from the following description read in conjunction with the accompanying drawing in which:

FIGURE 1 is a wiring diagram illustrating a preferred system provided in accordance with the invention; and FIGURE 2 is a diagram illustrating in particular the relationships between the optical elements of a preferred oximeter.

The particular optical system utilized does not form a part of the present invention and the arrangement of light and sensitive elements may be of conventional type. Either transmitted or reflected light may be viewed by the sensitive elements. FIGURE 2, however, shows a desirable arrangement of the elements involving a transparent plastic block 2 provided with a surface 4 which may be either of optically clear or ground type. This surface 4 is adapted to be engaged with the pinna of the ear of the subject undergoing observation, there being provided a steady source of illumination by a lamp 8 on the opposite side of the ear so that the measurement is made by transmitted light. Embedded within the block 2 are a pair of symmetrically conducting photoresistive cells 10 and 12 which are arranged to face the surface 4. Over these there are arranged filters 14 and 16 of suitable characteristics depending upon the wave lengths to be observed and the spectral characteristics of the cells used. Thus each cell and its associated filter constitutes a light-sensitive means. Various types of photosensitive cells may be used among which may be mentioned conventional selenium cells and conventional lead sulfide cells. At the present time selenium cells have been found most satisfactory since lead sulfide cells are more sensitive to temperature changes and also have the disadvantage that infra-red distant from the visible spectrum must be eliminated by filters.

The particular spectral characteristics which are utilized have been discussed in the literature and, accordingly, the matter of spectral sensitivity need not be here discussed in detail. Briefly, however, it may be pointed out that it is generally desirable to provide peaked responses of the respective sensitive elements at wave lengths of about 640 and 800 millimicrons. At the former wave length reduced hemoglobin has a very low relative transmission while oxyhemoglobin has a quite high relative transmission. At the latter wave length the relative transmissions of both reduced and oxyhemoglobin are approximately the same, this being the wave length at which the spectral transmission curves of the two constituents cross each other.

The lamp 8 is desirably of filament type and for aviation use the filament may be excited at 400 cycles per second, which gives rise to a substantially steady illumination. As will be pointed out, any alternating signal arising from fluctuations of intensity at this frequency of the lamp filament are substantially eliminated by the electrical parts of the apparatus.

The two sensitive elements 10 and 12 have a common junction 18 and a pair of corresponding terminals 20 and 22 indicated in FIGURE 2.

Referring now to FIGURE 1, there is illustrated therein an oscillator 30 which may be of any conventional type desirably having an output frequency which differs from any stray frequencies and their harmonics. It has been found, for example, that an oscillator having a frequency of 387 cycles per second is highly satisfactory, though it is to be understood that various other higher or lower frequencies might equally well be used so long as they are subject to ready and stable amplification by means of a conventional audio amplifier.

The output of the oscillator 30 is delivered to the primary of a transformer 32 the secondary of which is center tapped to provide, in effect, a pair of secondaries 34 and 36 respectively used for the excitation of the photosensitive elements. A pair of potentiometers 38 and 40 are arranged as indicated having a common terminal connected to the center tap of the transformer secondary and, in some instances, through a biasing battery 42 to ground. Such a biasing battery is used if the photosensitive elements are, for example, selenium cells. A biasing battery is not required in the case of lead sulfide and various other cells. The adjustable contacts of the potentiometers 38 and 40 are respectively connected to the terminals 20 and 22 of the sensitive elements, and the junction 18 thereof is connected to the conventional audio amplifier 44, there being indicated the presence of a resistor between the input terminal of the amplifier and its ground, this resistor serving to complete the D.C. circuit of the biasing battery. As will become apparent, the direct currents are of no consequence except from the biasing standpoint, the effective input to the amplifier being alternating and derived from the oscillator.

The output of the amplifier is delivered to the primary of a transformer 46 the secondary of which has its center tap 48 connected to ground through the secondary of a transformer 50 the primary of which receives current through connection 52 to the oscillator output. Triodes 54 and 56 have their grids connected through condensers 58 and 60 to the terminals of the secondary of the transformer 46. The grids are respectively connected to the grounded cathodes through resistors 62 and 64. It has been found desirable to have the RC constant of each of the condenser-resistor combinations approximately equal to ten times the reciprocal of the oscillator frequency.

Anode load resistors 66 and 68 are respectively provided for the triodes. A meter 70 is connected between the anodes and is desirably of a galvanometer type serving to read on both sides of zero. This meter may be calibrated in terms of percentage of oxygen saturation, the zero of the original galvanometer then falling in some intermediate range of the percent oxygen scale.

The operation of the described apparatus is as follows:

It will be noted that the photoresistive cells and the portions of the potentiometers 38 and 40 inwardly of their adjustable contacts form a bridge energized from transformer 32 and providing its alternating output between ground and the junction 18.

Designating the resistance values of cells represented by resistors 24 and 26 in FIGURE 1 as $R_1$ and $R_2$, respectively, and designating the alternating potentials at the contacts of potentiometers 38 and 40, respectively, as $E_1$ and $E_2$, the potential $e$ appearing at the junction 18 is as given in the equation at the bottom of FIGURE 1. It may be remarked that the minus sign associated with the second term in the numerator of the fraction takes into account the reverse phases of the inputs at terminals 20 and 22. It will be evident, therefore, that if $R_1$ equals $R_2$ and $E_1$ equals $E_2$ the input to the amplifier will be zero and the same condition would result if $R_1$ were different from $R_2$ provided the contacts of potentiometers 38 and 40 are adjusted to secure a corresponding set of values for $E_1$ and $E_2$. Thus the zero condition of the apparatus is adjusted. It will be evident that to the extent that $R_1$ and $R_2$ change in the same sense, there will be little change in the value of $e$. Whereas, if $R_1$ and $R_2$ change differentially, there will be a relatively large change in the amplifier input. Considering, therefore, the optical system and the filter arrangements as described above, it will be clear that the component of the signal due to changes in oxygen content of the blood will be relatively large in proportion to changes in the total blood volume and, in fact, with suitable initial adjustments the latter may be very effectively suppressed so as to have a negligible disturbing effect on the readings of the meter 70. It will also be evident that due to the symmetry of the arrangement variations due to change of temperature, voltage input, etc. are minimized.

The demodulating system, comprising the triodes 54 and 56 and their connections, is of synchronous type making use of rectification in the grid circuits. The input to the grids from the oscillator through the transformer 50 is always in excess of the signal voltages from the amplifier and synchronous rectification accordingly occurs, suppressing effects due to frequencies other than the oscillator frequency and cumulatively building up relative potentials at the grids and, hence, at the anodes for operation of the meter 70 which is of direct current type. The apparatus is accordingly relatively insensitive to all disturbing factors including quantity of blood present in the optical system while, at the same time, being highly sensitive to the oxygen content of the blood.

It will be evident that the meter at 70 may be replaced by, or may be associated with, a sensitive relay which may be set to actuate visual or audible signals under conditions of dangerously low oxygen content of the blood. Such an arrangement is particularly useful in aviation application to warn a pilot of insufficiency of his oxygen supply.

While the description has been primarily directed to an oximeter, it will be evident that the same general principles are involved in color comparison apparatus, or the like, and accordingly that the photoelectric cells and the circuitry described are applicable to such uses.

It may also be noted that various other types of circuit elements are equivalent to those which have been disclosed and, accordingly, there may be used other conventional synchronous demodulators as well as other balancing circuits involving the light-sensitive resistance cells. It is accordingly to be understood that the invention is not to be considered as limited except as required by the following claims.

What is claimed is:

1. An oximeter for response to the oxygen concentration in blood comprising a light source, a pair of light-sensitive means arranged relatively to said light source to receive illumination from a single blood sample illuminated by said source, said light-sensitive means comprising similar light-sensitive photoresistive cells providing symmetrically conducting resistances dependent upon light incident thereon associated individually with filters having different spectral transmission characteristics interposed in the paths of illumination incident on the cells, one of said cells and its associated filter having a peaked response at a wave length of about 800 millimicrons, and the other of said cells and its associated filter having a peaked response at a wave length of about 640 millimicrons, a bridge circuit including said cells as resistances in adjacent arms thereof and impedances in the other arms thereof, at least one of the last mentioned impedances being adjustable to balance the bridge circuit, means supply alternating current to said bridge circuit to energize the same, and means receiving alternating output of said bridge circuit and providing a signal of the differential responses of said cells to the light incident thereon through said filters.

2. An oximeter for response to the oxygen concentration in blood comprising a light source, a pair of light-sensitive means arranged relatively to said light source to receive illumination from a single blood sample illuminated by said source, said light-sensitive means comprising similar light-sensitive photoresistive cells providing symmetrically conducting resistances dependent upon light incident thereon associated individually with filters having different spectral transmission characteristics interposed in the paths of illumination incident on the cells, one of said cells and its associated filter having a peaked response at a wave length of about 800 millimicrons, and the other of said cells and its associated filter having a peaked response at a wave length of about 640 millimicrons, a bridge circuit including said cells as resistances in adjacent arms thereof and impedances in the other arms thereof, at least one of the last mentioned impedances being adjustable to balance the bridge circuit, means supplying alternating current to said bridge circuit to energize the same, and means receiving alternating output of said bridge circuit and providing a signal of the differential responses of said cells to the light incident thereon through said filters, the last mentioned means comprising a synchronous demodulating means providing a direct current signal of said differential response.

References Cited in the file of this patent

UNITED STATES PATENTS

| | | |
|---|---|---|
| 1,971,317 | Sheldon et al. | Aug. 21, 1934 |
| 2,244,826 | Cox | June 10, 1941 |
| 2,411,672 | Van den Akker | Nov. 26, 1946 |
| 2,439,857 | Millikan | Apr. 20, 1948 |
| 2,586,746 | Tyler | Feb. 19, 1952 |
| 2,587,219 | Rettinger | Feb. 26, 1952 |
| 2,640,389 | Liston | June 2, 1953 |
| 2,706,927 | Wood | Apr. 26, 1955 |
| 2,721,942 | Friel et al. | Oct. 25, 1955 |
| 2,722,156 | Warren | Nov. 1, 1955 |